(12) United States Patent
Williams et al.

(10) Patent No.: US 12,451,643 B2
(45) Date of Patent: Oct. 21, 2025

(54) FACEPLATE ASSEMBLY FOR COAXIAL TAPS

(71) Applicant: Charter Communications Operating, LLC, St. Louis, MO (US)

(72) Inventors: John Williams, Aurora, CO (US); Marek Hajduczenia, Castle Rock, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 509 days.

(21) Appl. No.: 17/903,357

(22) Filed: Sep. 6, 2022

(65) Prior Publication Data
US 2024/0047918 A1    Feb. 8, 2024

Related U.S. Application Data

(60) Provisional application No. 63/395,411, filed on Aug. 5, 2022.

(51) Int. Cl.
*H01R 13/512* (2006.01)
*H01R 13/52* (2006.01)

(52) U.S. Cl.
CPC ....... *H01R 13/5213* (2013.01); *H01R 13/512* (2013.01)

(58) Field of Classification Search
None
See application file for complete search history.

(56) References Cited

U.S. PATENT DOCUMENTS

| | | | |
|---|---|---|---|
| 2,694,182 A | 11/1954 | Edlen et al. | |
| 2,694,183 A | 11/1954 | Edlen et al. | |
| 5,892,413 A * | 4/1999 | Okimura | H04N 7/102 333/100 |
| 8,869,223 B2 * | 10/2014 | Menna | H04N 7/102 174/382 |
| 10,312,607 B2 * | 6/2019 | Wilson | H01R 12/515 |
| 2018/0254538 A1 * | 9/2018 | Palawinna | H05K 5/03 |

OTHER PUBLICATIONS

Author Unknown, "Jerrold Receiver Isolation Network Model 1401-(*), Instruction Sheet, 435-172.1," Jerrold Electronics Corp., Philadelphia, Pennsylvania, http://theoldcatvequipmentmuseum.org/170/171/1713/Jerrold%20Isolation%20Network%20Model%201401-X%201960.pdf, 1960, 3 pages.

Author Unknown, "The Old CATV Equipment Museum, Outside Plant, System Passives: Self-piercing Taps (Pressure Taps), " http://theoldcatvequipmentmuseum.org/160/163/1633/index.html, May 10, 2022, 34 pages.

* cited by examiner

*Primary Examiner* — Tho D Ta
(74) *Attorney, Agent, or Firm* — Dority & Manning, P.A.

(57) ABSTRACT

A faceplate assembly for a coaxial tap includes a first plate that is insertable within an internal volume defined by a backplate coaxial tap. The first plate includes an electrical path from an input of the coaxial tap to an output of the coaxial tap. The faceplate assembly further includes a second plate removably coupled to the backplate to enclose the first plate within the internal volume defined by the backplate. The second plate includes a RF splitter circuit electrically coupled to the electrical path on the first plate. Furthermore, the RF splitter circuit can be configured to transmit at least the RF signal to the plurality of taps of the coaxial tap.

23 Claims, 8 Drawing Sheets

FACEPLATE ASSEMBLY FOR COAXIAL TAPS

BACKGROUND

Coaxial taps can be positioned along a feeder coaxial cable carrying a power signal and a radiofrequency (RF) signal. Drop coaxial cables can be connected to corresponding coaxial taps. The RF signal can then be provided to subscribers via the drop coaxial cables. In this manner, the coaxial taps can allow the RF signal to be provided to subscribers without terminating the feeder coaxial cable.

SUMMARY

The implementations disclosed herein are directed to a faceplate assembly that can be retrofitted to existing coaxial taps. The faceplate assembly includes a first plate that is insertable into an internal volume defined by a backplate of the existing coaxial tap. The first plate includes an electrical path that acts as a permanent bypass of a switching device (e.g., mechanical switch) included within the internal volume of the backplate of the existing coaxial tap. Furthermore, the faceplate assembly includes a second plate that is removably coupled to the backplate to enclose the first plate within the internal volume of the backplate. The second plate includes RF circuitry (e.g., directional coupler, splitter circuit) needed to provide the RF signal received at the input of the coaxial tap to each of the respective taps of the coaxial tap. Additionally, since the second plate is separate from the first plate that provides the continuous electrical path from the input of the coaxial tap to the output of the coaxial tap, the second plate can be removed from the backplate and replaced with a different plate to upgrade the RF circuitry as needed to accommodate higher frequency RF signals without needed to resplice the coaxial tap.

According to an example of the present disclosure is directed to a coaxial tap. The coaxial tap includes an input couplable to a first feeder coaxial cable carrying a power signal and a RF signal. The coaxial tap includes an output couplable to a second feeder coaxial cable. The coaxial tap includes a plurality of taps. Each of the taps is couplable to a respective drop coaxial cable. The coaxial tap includes a backplate defining an internal volume. The coaxial tap includes a faceplate assembly. The faceplate assembly includes a first plate positioned within the internal volume defined by the backplate. The first plate includes an electrical path from the input of the coaxial tap to the output of the coaxial tap. The faceplate assembly further includes a second plate removably coupled to the backplate to enclose the first plate within the internal volume. The second plate includes a RF splitter circuit electrically coupled to the electrical path on the first plate. Furthermore, the RF splitter circuit is configured to transmit at least the RF signal to the plurality of taps of the coaxial tap.

In some implementations, the backplate includes a switching device that is positioned within the internal volume of the backplate and is decoupled from the input and the output.

In some implementations, the first plate includes a RF connector electrically coupled to the electrical path and configured to output the RF signal. Furthermore, the RF splitter circuit is electrically coupled to the RF connector.

In some implementations, the second plate of the faceplate assembly includes a directional coupler that is electrically coupled between the RF connector and the RF splitter circuit.

In some implementations, the first plate includes a power connector configured to output the power signal. Furthermore, the RF splitter circuit is electrically coupled to the power connector and is configured to transmit the power signal to at least one of the plurality of taps.

In some implementations, the second plate includes a choke electrically coupled between the power connector and the RF splitter circuit.

In some implementations, the first plate of the faceplate assembly includes a choke electrically coupled to the electrical path.

In some implementations, the first plate of the faceplate assembly includes one or more filter devices electrically coupled to the electrical path.

In some implementations, the one or more filter devices include a first capacitor and a second capacitor.

According to another example aspect of the present disclosure is directed to a faceplate assembly for a coaxial tap. The faceplate assembly includes a first plate positioned within an internal volume defined by a backplate of the coaxial tap. The first plate includes an electrical path from an input of the coaxial tap to an output of the coaxial tap. The faceplate assembly further includes a second plate removably coupled to the backplate to enclose the first plate within the internal volume. The second plate includes a RF splitter circuit electrically coupled to the electrical path on the first plate. The RF splitter circuit is configured to transmit at least the RF signal to the plurality of taps of the coaxial tap.

In some implementations, the first plate includes a RF connector and the RF splitter circuit is electrically coupled to the RF connector.

In some implementations, the second plate includes a directional coupler that is electrically coupled between the RF connector and the RF splitter circuit.

In some implementations, the first plate includes a power connector and the RF splitter circuit is electrically coupled to the power connector.

In some implementations, the second plate includes a choke electrically coupled between the power connector and the RF splitter circuit.

In some implementations, the first plate includes a choke electrically coupled to the electrical path.

In some implementations, the first plate includes one or more filter devices electrically coupled to the electrical path. Furthermore, in some implementations, the one or more filter devices include a first capacitor and a second capacitor.

According to yet another example aspect a method for replacing a faceplate of a coaxial tap with a faceplate assembly is provided. The method includes removing the faceplate from a backplate of the coaxial tap. After removing the faceplate from the backplate, the method includes inserting a first plate of the faceplate assembly into an internal volume defined by the backplate to electrically couple an electrical path on the first plate to an input of the coaxial tap and an output of the coaxial tap. The method includes attaching a second plate of the faceplate assembly to the backplate to electrically couple a radiofrequency (RF) splitter circuit on the second plate to the electrical path on the first plate.

In some implementations, removing the faceplate from the backplate causes a switching device in the backplate to move from a first position in which the switching device is decoupled from the input and the output to a second position in which the switching device is coupled to the input and the output.

In some implementations, inserting the first plate into the internal volume causes the switching device to move from the second position to the first position.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

Implementations of the present disclosure are directed to coaxial taps. A coaxial tap can be spliced into a feeder coaxial tap carrying a power signal and a RF signal. Furthermore, drop coaxial cables can be connected to the coaxial tap. Each of the drop coaxial cables can deliver the RF signal to a different subscriber (e.g., customer). In this manner, the coaxial tap allows the RF signal to be provided to subscribers without needing to terminate the feeder coaxial cable.

A coaxial tap can include a backplate and a faceplate that is removably coupled to the backplate via one or more fasteners (e.g. screws). The faceplate can include RF circuitry configured to transmit the RF signal to each of a plurality of taps of the coaxial tap. The RF circuitry can include, for instance, a directional coupler and a RF splitter circuit.

The backplate can include a switching device (e.g., mechanical switch) that is configurable in a first state or a second state depending on whether the faceplate is coupled to the backplate. For instance, the switching device can be decoupled from an input of the coaxial tap and an output of the coaxial tap when the faceplate is coupled to the backplate and provides an electrical path from the input of the coaxial tap to the output of the coaxial tap. The switching device can be coupled to the input of the coaxial tap and the output of the coaxial tap immediately before the faceplate is decoupled (e.g., removed) from the backplate. In this manner, the signals (e.g., power signal and RF signal) being carried on the feeder coaxial cable can pass through the coaxial tap and continue along the feeder coaxial cable so that service downstream off the coaxial tap is unaffected by the faceplate being decoupled from the backplate.

It should be understood that the coaxial tap may need to be upgraded from time to time to handle higher frequency (e.g., about 2 Gigahertz) RF signals being carried along the feeder coaxial cable. Currently, coaxial taps must be replaced with a new coaxial tap. This process of swapping out the coaxial tap leads to downtime for subscribers because the new coaxial tap must be spliced into the feeder coaxial cable.

Example aspects of the present disclosure are directed to a faceplate assembly for existing coaxial taps. The faceplate assembly includes a first plate that is insertable into the internal volume of the backplate. More particularly, the first plate can be inserted within the internal volume of the backplate to cause the switching device included in the backplate to be in the first state in which the switching device is decoupled from the input of the coaxial tap and the output of the coaxial tap. Furthermore, the first plate can include an electrical path that is coupled to the input of the coaxial tap and the output of the coaxial tap. Still further, since the first plate is intended to remain within the internal volume of the backplate, the input of the coaxial tap can be continuously electrically coupled to the output of the coaxial tap via the electrical path.

The first plate includes a RF connector positioned along the electrical path. The RF connector is configured to output the RF signal that is received at the input of the coaxial tap. In some implementations, the first plate can include a power connector positioned along the electrical path. The power connector can be configured to output the power signal received at the input of the coaxial tap.

The faceplate assembly further includes a second plate that can be removably coupled to the backplate of the coaxial tap. The second plate is removably coupled to the backplate to enclose the first plate within the internal volume of the backplate.

The second plate includes the RF splitter circuit and the direction coupler discussed above with reference to the faceplate. The RF splitter circuit on the second plate is electrically coupled to the electrical path on the first plate. More particularly, the RF splitter circuit is electrically coupled to the RF connector on the first plate. Furthermore, the directional coupler can be electrically coupled between the RF connector and the RF splitter circuit.

Aspects of the present disclosure provide technical effects and benefits. For instance, the first plate of the faceplate assembly provides a continuous electrical path from the input of the coaxial tap to the output of the coaxial tap. In this manner, the switching device, which can affect the frequency response of the RF signal, can be permanently bypassed. This in turn allows the RF circuitry on the second plate to be updated (e.g., swapped out) without needing to resplice the coaxial tap. Furthermore, since the second plate of the faceplate assembly is separate from the first plate, the second plate can be swapped out to upgrade the frequency response of the coaxial tap without causing any downtime to subscribers.

Figure 1:
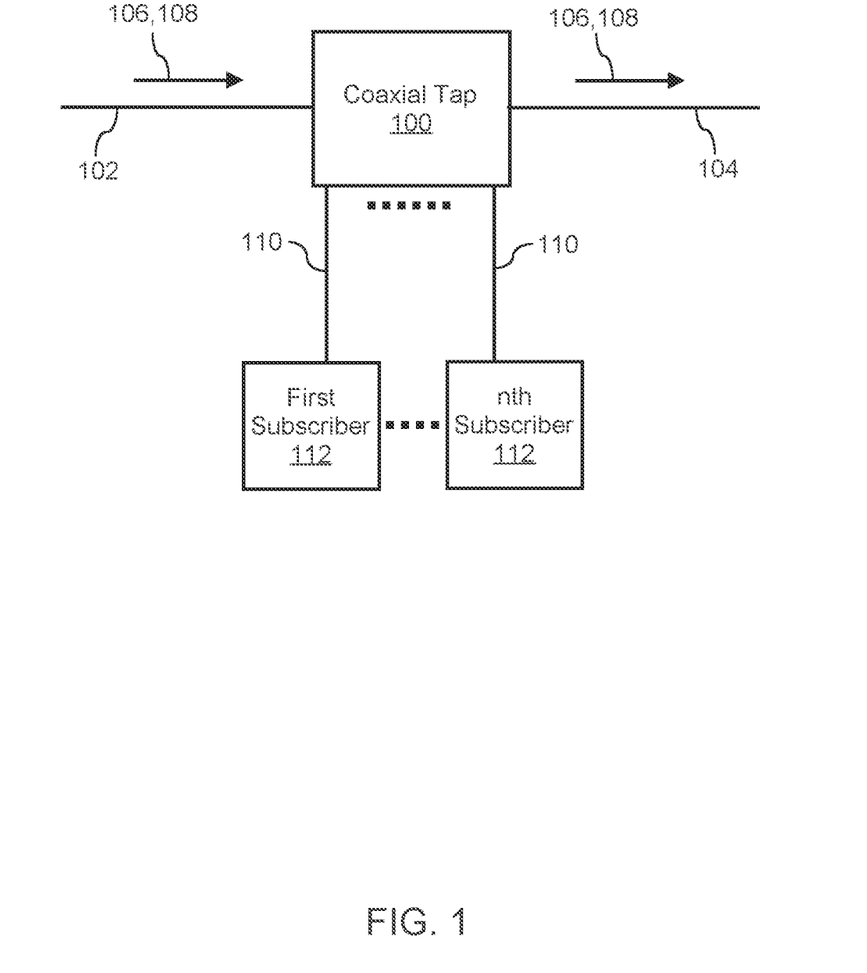
FIG. 1 depicts a schematic of a coaxial tap spliced onto a feeder coaxial cable according to example implementations of the present disclosure.

Referring now to the FIGS., FIG. 1 illustrates a coaxial tap 100 spliced onto a feeder coaxial cable according to example implementations of the present disclosure. The coaxial tap 100 can be electrically coupled between a first feeder coaxial cable 102 and a second feeder coaxial cable 104. The first feeder coaxial cable 102 can be configured to carry a power signal 106 and a RF signal 108 from a coaxial plant. The coaxial tap 100 can provide the power signal 106 and the RF signal 108 to the second feeder coaxial cable 104. In this manner, the power signal 106 and the RF signal 108 can be carried along the second feeder coaxial cable 104 to another coaxial tap that is positioned downstream of the coaxial tap 100.

As shown, drop coaxial cables 110 can be connected to the coaxial tap 100. Each of the drop coaxial cables 110 can be deliver the RF signal 108 to a different subscriber 112 (e.g., customer). In this manner, the coaxial tap 100 allows at least the RF signal 108 to be provided to subscribers 112 without needing to terminate the feeder coaxial cable. Details of the coaxial tap 100 will now be discussed in more detail.

Figure 2:
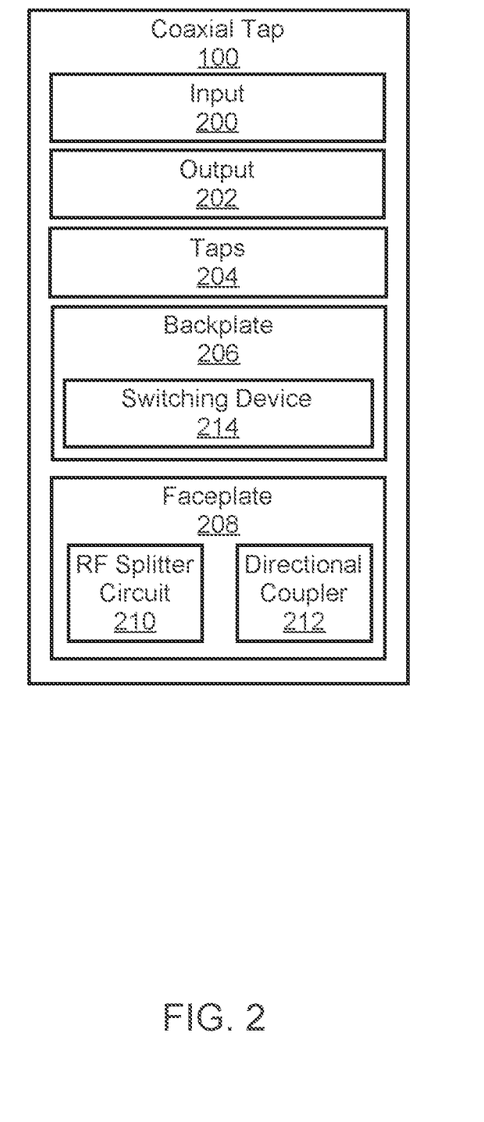
FIG. 2 depicts a block diagram of components of a coaxial tap according to example implementations of the present disclosure.

Referring now to FIG. 2, a block diagram of components of the coaxial tap 100 is provided according to example implementations of the present disclosure. As shown, the coaxial tap 100 includes an input 200, an output 202, and a plurality of taps 204. The input 200 is couplable to the first feeder coaxial cable 102 (FIG. 1) and the output 202 is couplable to the second feeder coaxial cable 104 (FIG. 1). Furthermore, drop coaxial cables 110 (FIG. 1) can be coupled to one or more of the respective taps 204.

The coaxial tap 100 includes a backplate 206 and a faceplate 208 that is removably coupled to the backplate 206 via one or more fasteners (e.g. screws). The faceplate 208 includes RF circuitry configured to transmit the RF signal 108 (FIG. 1) to each of the plurality of taps 204 of the coaxial tap 100. The RF circuitry can include, for instance, a RF splitter circuit 210 and a directional coupler 212. It should be understood that the RF splitter circuit 210 and the directional coupler 212 can be implemented on one or more circuit boards. For instance, in some implementations, the RF splitter circuit 210 and the directional coupler 212 can be implemented on the same circuit board. In alternative implementations, the RF splitter circuit 210 and the directional coupler 212 can be implemented on separate circuit boards. In some implementations, the one or more circuit boards including the RF splitter circuit 210 and the directional coupler 212 can be coupled (e.g., attached) to the faceplate 208.

The backplate 206 can include a switching device 214 (e.g., mechanical switch) that is coupled between the input 200 of the coaxial tap 100 and the output 202 of the coaxial tap 100. The switching device 214 can be configurable in a first state or a second state depending on whether the faceplate 208 is coupled to the backplate 206. As will be discussed below in more detail, the switching device 214 can be a make-before-break switch.

Figure 3A:
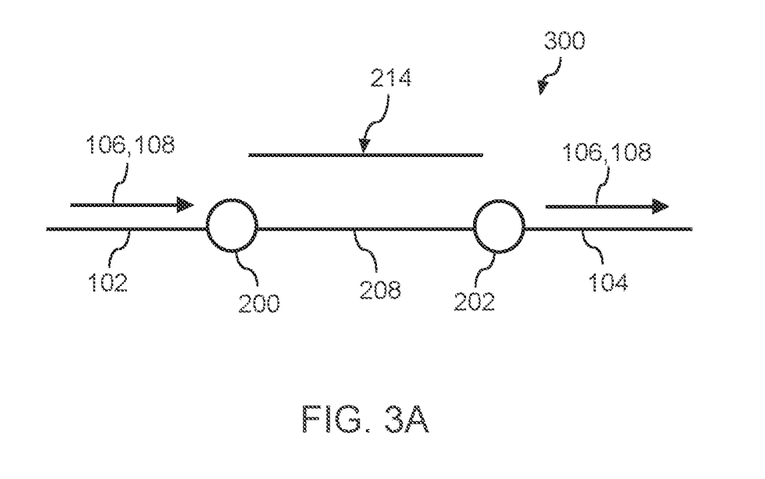
FIG. 3A depicts a switching device of a coaxial tap in a first state according to example implementations of the present disclosure.
Figure 3B:
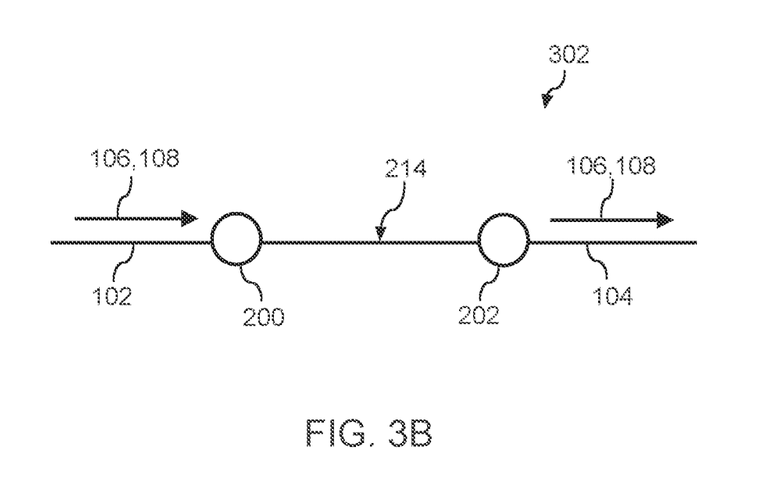
FIG. 3B depicts a switching device of a coaxial tap in a second state according to example implementations of the present disclosure.

Referring now to FIGS. 3A and 3B, the switching device 214 of the coaxial tap 100 (FIG. 2) is depicted in the first state 300 (FIG. 3A) and the second state 302 (FIG. 3B) according to example implementations of the present disclosure. When the faceplate 208 (FIG. 2) is coupled (e.g., attached) to the backplate 206 (FIG. 2), the input 200 of the coaxial tap 100 is electrically coupled to the output 202 of coaxial tap 100 via the faceplate 208 (FIG. 2). Thus, the switching device 214 is in the first state 300 in which the switching device 214 is decoupled from the input 200 of the coaxial tap 100 and the output 202 of the coaxial tap 100.

Before the faceplate 208 (FIG. 2) is decoupled (e.g., removed) from the backplate 206 (FIG. 2), the switching device 214 transitions from the first state 300 to the second state 302 in which the switching device 214 is coupled to the input 200 of the coaxial tap 100 and the output 202 of the coaxial tap 100. In this manner, the signals (e.g., power signal 106 and RF signal 108) being carried on the first feeder coaxial cable 102 (FIG. 1) can be provided to the second feeder coaxial cable 104 (FIG. 1) via the switching device 214 of the coaxial tap 100. Therefore, the switching device 214 allows service downstream off the coaxial tap 100 to be unaffected by the faceplate 208 being decoupled from the backplate 206.

Figure 4:
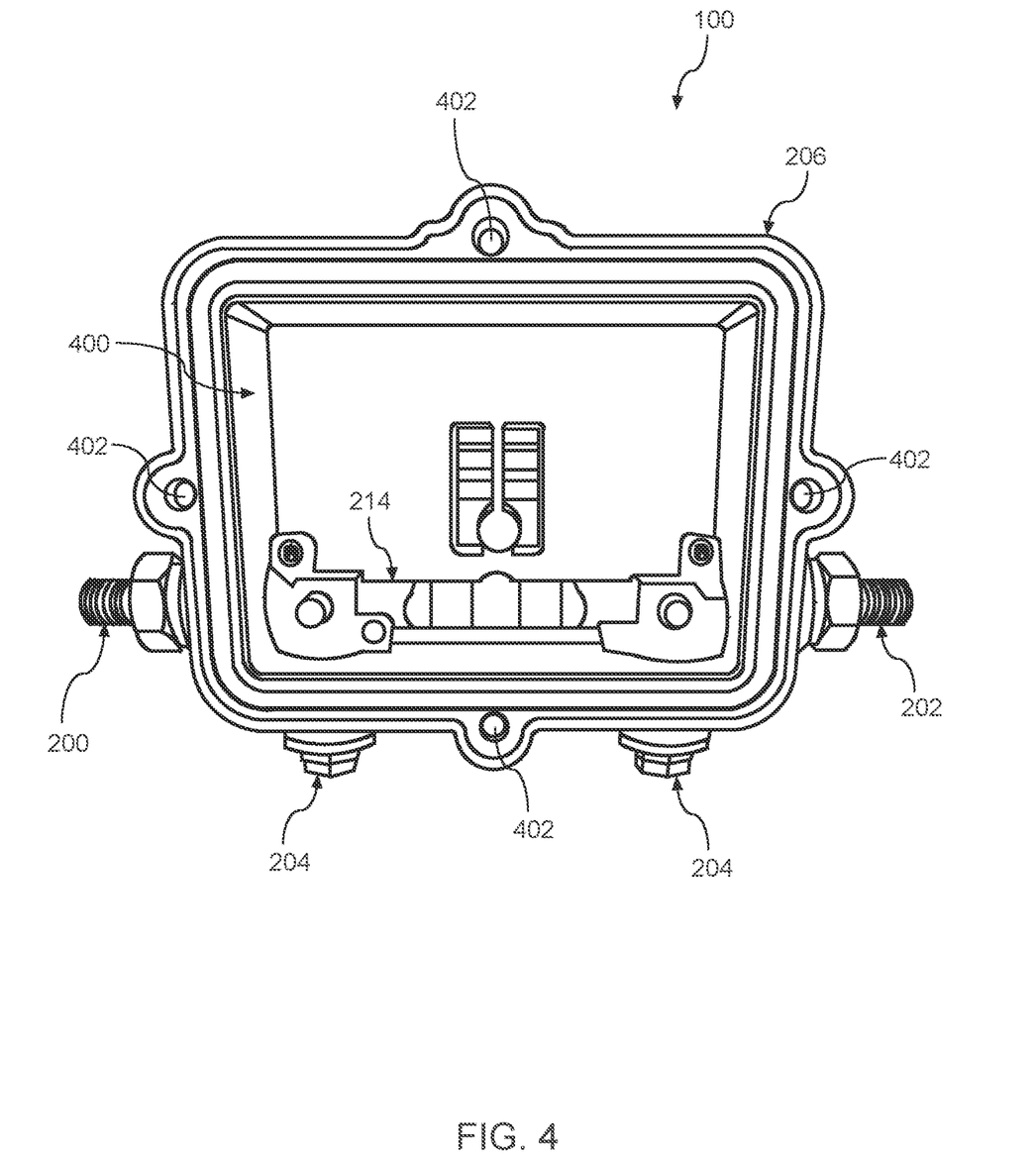
FIG. 4 depicts a backplate of a coaxial tap according to example implementations of the present disclosure.
Figure 5:
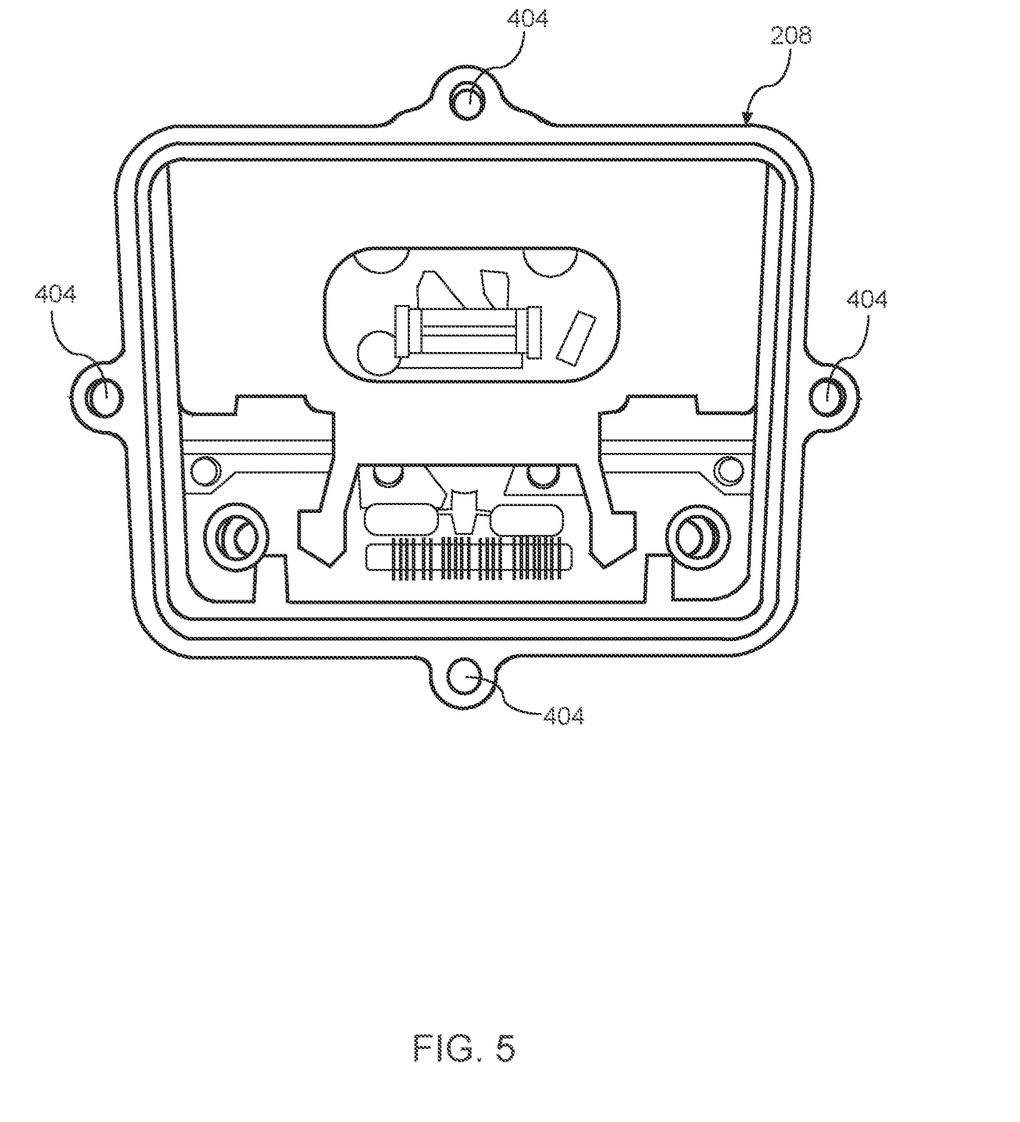
FIG. 5 depicts a faceplate of a coaxial tap according to example implementations of the present disclosure.

Referring now to FIGS. 4 and 5, the backplate 206 (FIG. 4) and the faceplate 208 (FIG. 5) are provided according to example implementations of the present disclosure. As shown, the backplate 206 defines an internal volume 400 (e.g., cavity) in which the switching device 214 is positioned. Additionally, in some implementations, the backplate 206 can define a plurality of mounting holes 402. Each of the mounting holes 402 can be positioned along a periphery of the backplate 206. Furthermore, in such implementations, the faceplate 208 can include a plurality of mounting holes 404. The mounting holes 404 can be positioned along a periphery of the faceplate 208. It should be appreciated that the faceplate 208 can be positioned on the backplate 206 so that each of the mounting holes 404 on the faceplate 208 aligns with a corresponding mounting hole 402 on the backplate 206. In this manner, fasteners (e.g., screws) can be passed through the aligned mounting holes 402, 404 to removably couple the faceplate 208 to the backplate 206.

It should be understood that the coaxial tap 100 may need to be upgraded from time to time to handle higher frequency (e.g., 2 Gigahertz) RF signals being carried along the feeder coaxial cable. Currently, the coaxial tap 100 must be replaced with a new coaxial tap. This process of swapping out the coaxial tap 100 leads to downtime for subscribers because the new coaxial tap must be spliced into the feeder coaxial cable. As will be discussed below in more detail, a faceplate assembly for coaxial taps is provided that allows existing coaxial taps to be upgraded. Thus, the faceplate assembly disclosed herein can reduce or eliminate the downtime associated with the current process of swapping out coaxial taps 100 to upgrade the frequency response thereof.

Figure 6:
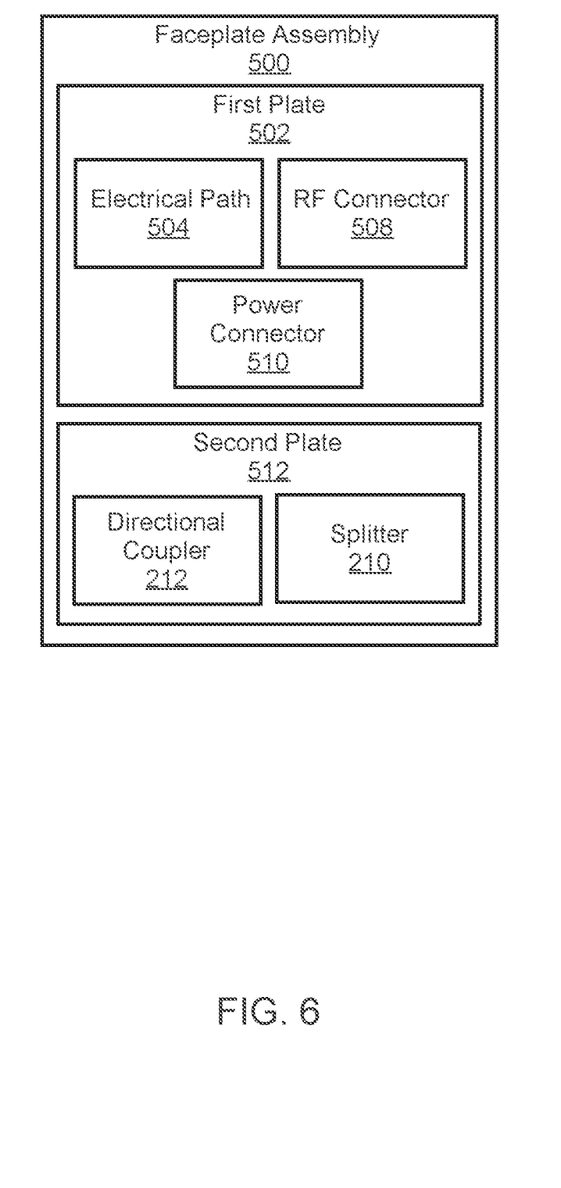
FIG. 6 depicts a block diagram of components of a faceplate assembly for a coaxial tap according to example implementations of the present disclosure.
Figure 7:
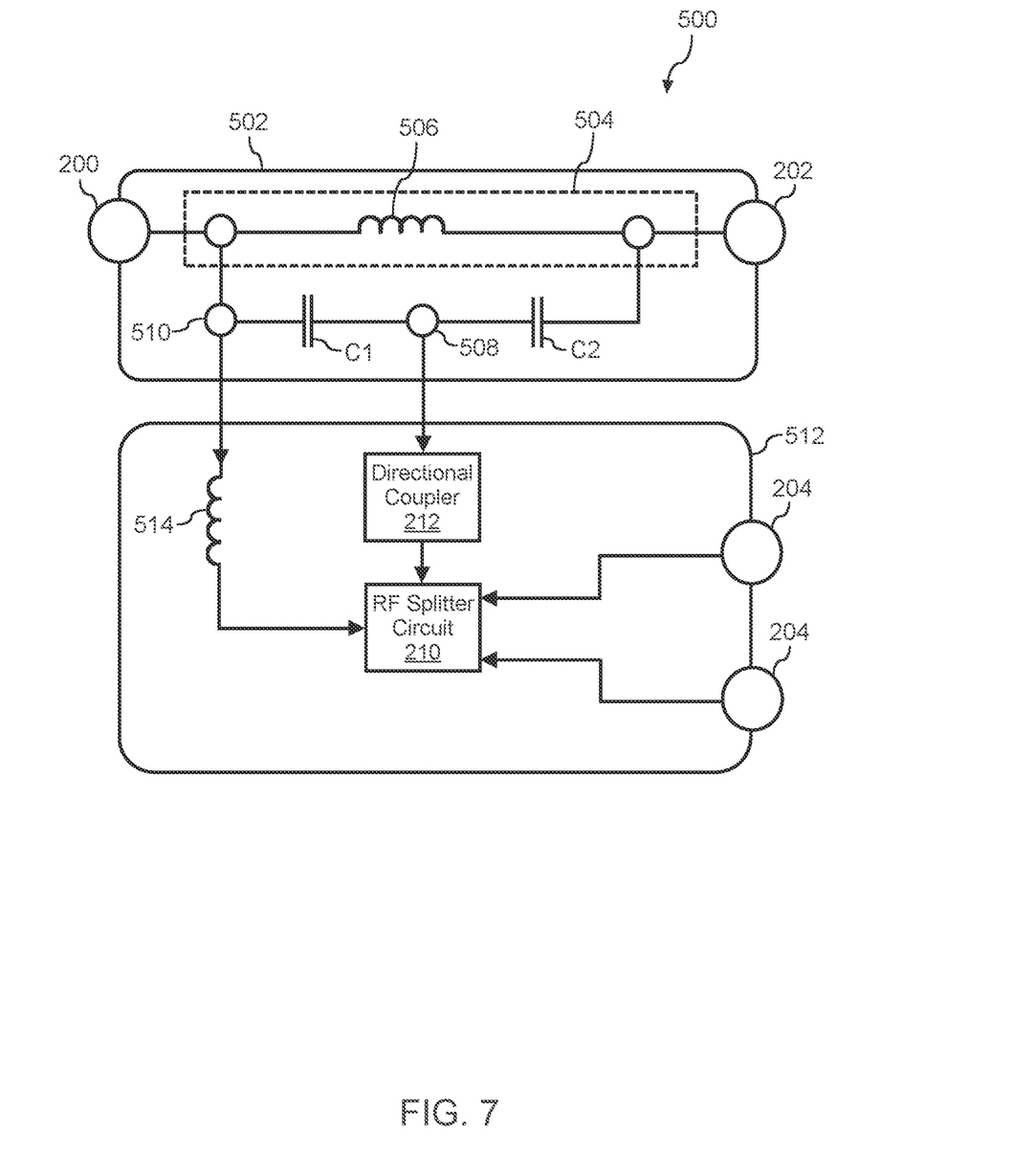
FIG. 7 depicts a schematic of a faceplate assembly according to example implementations of the present disclosure.

Referring now to FIGS. 6 and 7, a faceplate assembly 500 for a coaxial tap is provided according to example implementations of the present disclosure. For instance, the faceplate assembly 500 can be used on the coaxial tap 100 discussed above with reference to FIGS. 1-5. It should be appreciated, however, that the faceplate assembly 500 can replace the faceplate 208 of the coaxial tap 100. Details of the faceplate assembly 500 will now be discussed in more detail.

As shown, the faceplate assembly 500 includes a first plate 502 that is insertable into the internal volume 400 (FIG. 4) defined by the backplate 206 (FIG. 4) of the coaxial tap 100. More particularly, the first plate 502 can be inserted within the internal volume 400 of the backplate 206 (FIG. 4) to cause the switching device 214 (FIG. 4) to be in the first state 300 (FIG. 3A) in which the switching device 214 is decoupled from the input 200 of the coaxial tap 100 and the output 202 of the coaxial tap 100.

The first plate 502 includes an electrical path 504 that is coupled to the input 200 of the coaxial tap 100 and the output 202 of the coaxial tap 100. For instance, in some implementations, the first plate 502 can be implemented as a circuit board that includes the electrical path 504 from the input 200 of the coaxial tap 100 to the output 202 of the coaxial tap 100 when the first plate 520 is inserted into the internal volume 400 of the backplate 206. Furthermore, since the first plate 502 is intended to remain within the internal volume 400 of the backplate 206, the input 200 of the coaxial tap 100 can be continuously electrically coupled to the output 202 of the coaxial tap 100 via the electrical path 504.

In some implementations, the first plate 502 can include one or more contacts that can press against the switching device 214 when the first plate 502 is positioned within the internal volume 400 defined by the backplate 206. In this manner, the first plate 502 can cause the switching device 214 to be in the first state 300 in which the switching device 214 is decoupled from the input 200 of the coaxial tap 100 and the output 202 of the coaxial tap 100.

In some implementations, the first plate 502 can include a choke 506 positioned along the electrical path 504. For instance, in some implementations, the choke 506 can include an inductor. Alternatively, or additionally, the first plate 502 can include one or more filter devices. For instance, in some implementations, the one or more filter devices can include a first capacitor C1 and a second capacitor C2.

The first plate 502 can include a RF connector 508 positioned along the electrical path 504. The RF connector 508 can be configured to output the RF signal 108 that is received at the input 200 of the coaxial tap 100. It should be understood that the RF connector 508 can include any suitable connector configured to output the RF signal. For instance, in some implementations, the RF connector 508 can be an electrical Y splitter. In some implementations, the RF connector 508 can include a tap.

In some implementations, the first plate 502 can include a power connector 510 positioned along the electrical path 504. The power connector 510 can be configured to output the power signal 106. It should be understood that the power connector 510 can include any suitable type of connector configured to output the power signal 106 which, in some implementations, can be a 90 Volt alternating current squarewave.

The faceplate assembly 500 further includes a second plate 512 that can be removably coupled to the backplate 206 (FIG. 2) of the coaxial tap 100. The second plate 512 can be removably coupled to the backplate 206 (FIG. 4) to enclose the first plate 502 within the internal volume 400 of the backplate 206. For instance, in some implementations, the second plate 512 can include mounting holes similar to mounting holes 404 discussed above with reference to the faceplate 208.

The second plate 512 includes the RF splitter circuit 210 and the directional coupler 212 discussed above with reference to the faceplate 208 of the coaxial tap 100. It should be understood that the RF splitter circuit 210 and the directional coupler 212 can be implemented on a circuit board that can be attached to the second plate 512. As shown, the RF splitter circuit 210 on the second plate 512 can be electrically coupled to the electrical path 504 on the first plate 502. More particularly, the RF splitter circuit 210 can be electrically coupled to the RF connector 508. As shown, the directional coupler 212 can be electrically coupled between the RF connector 508 and the RF splitter circuit 210.

In implementations in which the first plate 502 includes the power connector 510, the RF splitter circuit 210 can be electrically coupled to the power connector 510. In this manner, the power signal 106 can be provided to the RF splitter circuit 210 via the power connector 510. Furthermore, the RF splitter circuit 210 can be configured to provide the power signal 106 to at least one of the taps 204 of the coaxial tap 100.

In implementations in which the first plate 502 includes the power connector 510, the second plate 512 can, in some implementations, include a choke 514 electrically coupled between the power connector 510 and the RF splitter circuit 210. For instance, in some implementations, the choke 514 can include an inductor.

Figure 8:
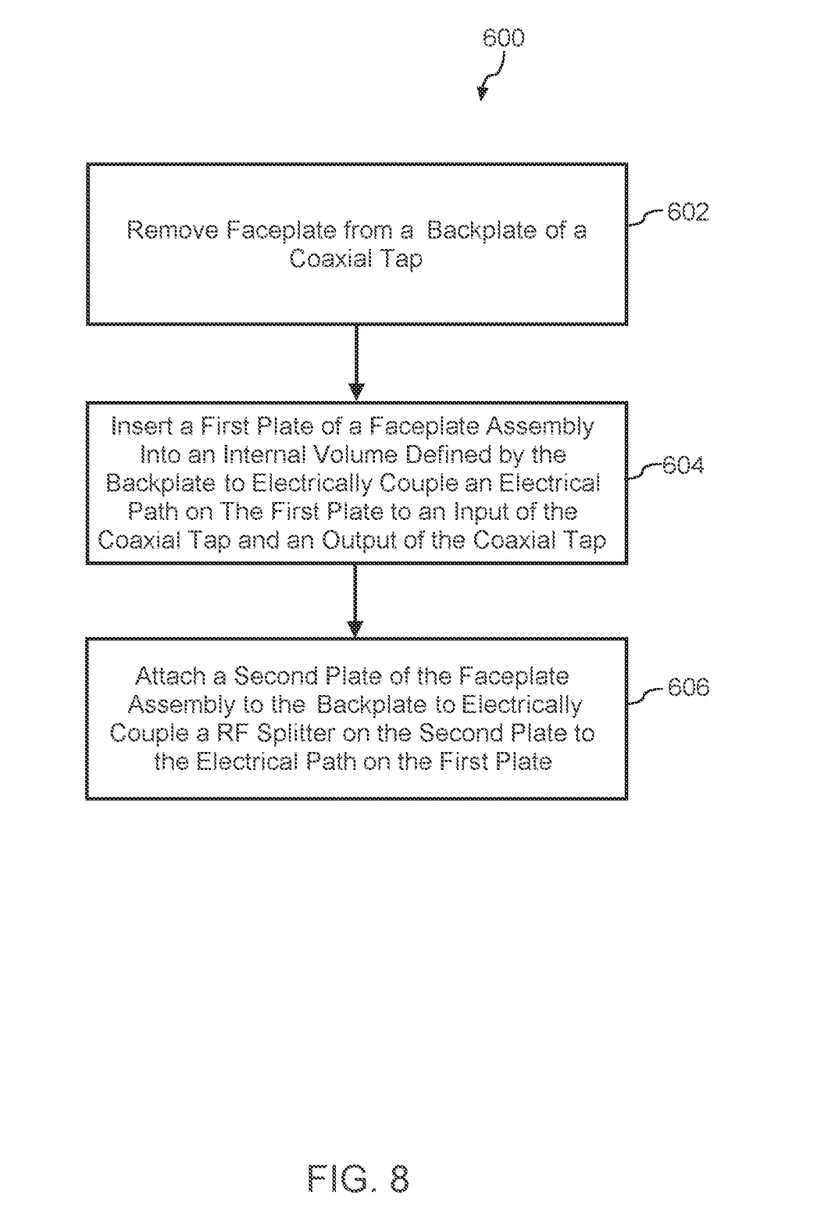
FIG. 8 depicts a flow diagram of a method for replacing a faceplate of a coaxial tap with a faceplate assembly according to example implementations of the present disclosure.

Referring now to FIG. 8, a flow diagram of a method 600 for replacing a faceplate of a coaxial tap with a faceplate assembly is provided according to example implementations of the present disclosure. For instance, the method 600 can be used to replace the faceplate 208 of the coaxial tap 100 discussed above with reference to FIGS. 1-5 with the faceplate assembly 500 discussed above with reference to FIGS. 6 and 7. In some implementations, the method 600 can be performed by a person. For instance, the person can include a technician trained to work with coaxial taps, such as the coaxial tap 100 discussed above with reference to FIGS. 1-5.

At (602), the method 600 can include removing the faceplate 208 from the backplate 206. For instance, the person can loosen the fasteners (e.g., screws) securing the faceplate 208 to the backplate 206. Once the faceplate 208 is removed the backplate 206, the method 600 can proceed to (604).

At (604), the method 600 can include inserting the first plate 502 of the faceplate assembly 500 into the internal volume 400 of the backplate 206 to electrically couple the electrical path 504 of the first plate 502 to the input 200 of the coaxial tap 100 and the output 202 of the coaxial tap 100. As discussed above, the first plate 502 is intended to remain in the internal volume 400 of the backplate 206. Thus, the electrical path 504 on the first plate 502 can provide a continuous electrical path from the input 200 of the coaxial tap 100 to the output 202 of the coaxial tap 100.

At (606), the method 600 can include coupling the second plate 512 of the faceplate assembly 500 to the backplate 206 to electrically couple the RF splitter circuit 210 on the second plate 512 to the electrical path 504 on the first plate 502 so that the RF splitter circuit 210 can receive the RF signal 108. Additionally, in implementations in which the first plate 502 includes the power connector 510, the power signal 106 can be provided to the RF splitter circuit 210 and the RF splitter circuit 210 can be configured to provide the power signal 106 to at least one of the taps 204.

Aspects of the disclosure have been described in terms of illustrative implementations thereof. Numerous other implementations, modifications, and/or variations within the scope and spirit of the appended claims can occur to persons of ordinary skill in the art from a review of this disclosure. For example, one of ordinary skill in the art can appreciate that the steps depicted and/or described can be performed in other than the recited order and/or that one or more illustrated steps can be optional and/or combined. Any and all features in the following claims can be combined and/or rearranged in any way possible.

While the present subject matter has been described in detail with respect to various specific example implementations thereof, each example is provided by way of explanation, not limitation of the disclosure. Those skilled in the art, upon attaining an understanding of the foregoing, can readily produce alterations to, variations of, and/or equivalents to such implementations. Accordingly, the subject disclosure does not preclude inclusion of such modifications, variations, and/or additions to the present subject matter as would be readily apparent to one of ordinary skill in the art. For instance, features illustrated and/or described as part of one implementation can be used with another implementation to yield a still further implementation. Thus, it is intended that the present disclosure covers such alterations, variations, and/or equivalents.

Individuals will recognize improvements and modifications to the preferred examples of the disclosure. All such improvements and modifications are considered within the scope of the concepts disclosed herein and the claims that follow.

What is claimed is:

1. A coaxial tap, comprising:
an input couplable to a first feeder coaxial cable carrying a power signal and a radiofrequency (RF) signal;
an output couplable to a second feeder coaxial cable;
a plurality of taps, each of the taps couplable to a respective drop coaxial cable;
a backplate defining an internal volume; and
a faceplate assembly including:
a first plate positioned within the internal volume defined by the backplate, the first plate including an electrical path from the input to the output; and
a second plate removably coupled to the backplate to enclose the first plate within the internal volume, the second plate including a RF splitter circuit electrically coupled to the electrical path, the RF splitter circuit configured to transmit at least the RF signal to the plurality of taps.

2. The coaxial tap of claim 1, wherein the backplate includes a switching device that is positioned within the internal volume of the backplate and is decoupled from the input and the output.

3. The coaxial tap of claim 1, wherein:
the first plate includes a RF connector electrically coupled to the electrical path, the RF connector configured to output the RF signal; and
the RF splitter circuit is electrically coupled to the RF connector.

4. The coaxial tap of claim 3, wherein the second plate of the faceplate assembly includes a directional coupler that is electrically coupled between the RF connector and the RF splitter circuit.

5. The coaxial tap of claim 3, wherein:
the first plate includes a power connector configured to output the power signal; and
the RF splitter circuit is electrically coupled to the power connector and is configured to transmit the power signal to at least one of the plurality of taps.

6. The coaxial tap of claim 5, wherein the second plate includes a choke electrically coupled between the power connector and the RF splitter circuit.

7. The coaxial tap of claim 1, wherein the first plate of the faceplate assembly includes a choke electrically coupled to the electrical path.

8. The coaxial tap of claim 1, wherein the first plate of the faceplate assembly includes one or more filter devices electrically coupled to the electrical path.

9. The coaxial tap of claim 8, wherein the one or more filter devices include a first capacitor and a second capacitor.

10. A faceplate assembly for a coaxial tap, the faceplate assembly comprising:
a first plate insertable into an internal volume defined by a backplate of the coaxial tap, the first plate including an electrical path from an input of the coaxial tap to an output of the coaxial tap; and
a second plate couplable to the backplate of the coaxial tap to enclose the first plate within the internal volume defined by the backplate, the second plate including a RF splitter circuit.

11. The faceplate assembly of claim 10, wherein:
the first plate includes a RF connector; and
the RF splitter circuit is electrically coupled to the RF connector.

12. The faceplate assembly of claim 11, wherein the second plate includes a directional coupler that is electrically coupled between the RF connector and the RF splitter circuit.

13. The faceplate assembly of claim 11, wherein:
the first plate includes a power connector; and
the RF splitter circuit is electrically coupled to the power connector.

14. The faceplate assembly of claim 13, wherein the second plate includes a choke electrically coupled between the power connector and the RF splitter circuit.

15. The faceplate assembly of claim 10, wherein the first plate includes a choke electrically coupled to the electrical path.

16. The faceplate assembly of claim 10, wherein the first plate includes one or more filter devices electrically coupled to the electrical path.

17. The faceplate assembly of claim 16, wherein the one or more filter devices include a first capacitor and a second capacitor.

18. A method of replacing a faceplate of a coaxial tap with a faceplate assembly, the method comprising:
removing the faceplate from a backplate of the coaxial tap;
subsequent to removing the faceplate from the backplate, inserting a first plate of the faceplate assembly into an internal volume defined by the backplate to electrically couple an electrical path on the first plate to an input of the coaxial tap and an output of the coaxial tap; and attaching a second plate of the faceplate assembly to the backplate to electrically couple a radiofrequency (RF) splitter circuit on the second plate to the electrical path on the first plate.

19. The method of claim 18, wherein removing the faceplate from the backplate causes a switching device in the backplate to move from a first position in which the switching device is decoupled from the input and the output to a second position in which the switching device is coupled to the input and the output.

20. The method of claim 19, wherein inserting the first plate into the internal volume causes the switching device to move from the second position to the first position.

21. The coaxial tap of claim 1, wherein the backplate includes a switching device that is positioned within the internal volume defined by the backplate and in the absence of the first plate is operable to move from a first position within the internal volume wherein the switching device is decoupled from the input and the output to a second position within the internal volume wherein the switching device is coupled to the input and the output, and wherein the first plate prevents the switching device from being moved from the first position to the second position.

22. The coaxial tap of claim 1, wherein the backplate assembly comprises the plurality of taps.

23. The faceplate assembly of claim 10, wherein the first plate is operable to prevent a switching device that is positioned within the internal volume defined by the backplate and in the absence of the first plate is operable to move from a first position within the internal volume wherein the switching device is decoupled from the input and the output to a second position within the internal volume wherein the switching device is coupled to the input and the output, from being moved from the first position to the second position.

* * * * *